(12) United States Patent
Ko et al.

(10) Patent No.: US 12,157,839 B2
(45) Date of Patent: *Dec. 3, 2024

(54) ADHESIVE COMPOSITION

(71) Applicant: LG Chem, Ltd., Seoul (KR)

(72) Inventors: Min Jin Ko, Daejeon (KR); Jae Ho Jung, Daejeon (KR); Min A Yu, Daejeon (KR); Min Kyoun Kim, Daejeon (KR); Byung Kyu Cho, Daejeon (KR); Taek Yong Lee, Daejeon (KR); Dong Yong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 790 days.

This patent is subject to a terminal disclaimer.

(21) Appl. No.: 17/262,340

(22) PCT Filed: Jul. 25, 2019

(86) PCT No.: PCT/KR2019/009229
§ 371 (c)(1),
(2) Date: Jan. 22, 2021

(87) PCT Pub. No.: WO2020/022795
PCT Pub. Date: Jan. 30, 2020

(65) Prior Publication Data
US 2021/0284882 A1 Sep. 16, 2021

(30) Foreign Application Priority Data
Jul. 25, 2018 (KR) .......... 10-2018-0086342

(51) Int. Cl.
C09J 163/00 (2006.01)
C08G 18/24 (2006.01)
C08G 18/28 (2006.01)
C08G 18/32 (2006.01)
C08G 18/48 (2006.01)
C08G 18/66 (2006.01)
C08G 18/73 (2006.01)
C08G 59/40 (2006.01)
C08L 63/00 (2006.01)
C08L 75/08 (2006.01)
C09J 7/20 (2018.01)
C09J 7/38 (2018.01)
C09J 11/06 (2006.01)
C09J 11/08 (2006.01)
C09J 175/04 (2006.01)
C09J 175/08 (2006.01)

(52) U.S. Cl.
CPC ............ C09J 163/00 (2013.01); C08G 18/24 (2013.01); C08G 18/2825 (2013.01); C08G 18/3206 (2013.01); C08G 18/4854 (2013.01); C08G 18/6674 (2013.01); C08G 18/73 (2013.01); C08G 59/4021 (2013.01); C08L 63/00 (2013.01); C08L 75/08 (2013.01); C09J 7/20 (2018.01); C09J 7/38 (2018.01); C09J 11/06 (2013.01); C09J 11/08 (2013.01); C09J 175/04 (2013.01); C09J 175/08 (2013.01); C09J 2409/00 (2013.01); C09J 2463/00 (2013.01); C09J 2475/00 (2013.01)

(58) Field of Classification Search
CPC ................ C08G 18/24; C08G 18/2825; C08G 18/3206; C08G 18/4854; C08G 18/6674; C08G 18/73; C08G 59/4021; C08L 63/00; C08L 75/08; C09J 163/00; C09J 7/38; C09J 11/06; C09J 11/08; C09J 175/08; C09J 7/20; C09J 175/04; C09J 2409/00; C09J 2463/00; C09J 2475/00
See application file for complete search history.

(56) References Cited

U.S. PATENT DOCUMENTS 3,773,703 A * 11/1973 Smeal .................. C08G 59/504
523/450
4,778,851 A 10/1988 Henton et al.
5,084,532 A 1/1992 Schenkel
5,278,257 A 1/1994 Mulhaupt et al.
6,015,865 A 1/2000 Blank et al.
(Continued)

FOREIGN PATENT DOCUMENTS

CN 1772810 A 5/2006
CN 101517029 A 8/2009
(Continued)

OTHER PUBLICATIONS

Author Unknown, Huntsman Product Bulletin "Advanced Materials Hypox RA1340", Aug. 2020, pp. 1-2, obtained from https://www.huntsman.com/docs/Documents/HYPOX-RA1340_eur_e.pdf.*
Extended European Search Report for Application No. 19840034.3 dated Jun. 9, 2021. 7 pgs.
International Search Report for Application No. PCT/KR2019/009229, dated Oct. 25, 2019, 3 pages.
Search Report dated Jun. 10, 2022 from Office Action for Chinese Application No. 201980049078.3 issued Jun. 15, 2022. 3 pgs.
Search report from International Application No. PCT/KR2019/009230, mailed Oct. 25, 2019.
Extended European Search Report for Application No. 19840220.8, dated Jun. 15, 2021, 7 pages.
Search report from International Application No. PCT/KR2019/009233, mailed Oct. 24, 2019.
(Continued)

Primary Examiner — Patrick D Niland
(74) Attorney, Agent, or Firm — Lerner David LLP

(57) ABSTRACT

The present application relates to an epoxy-based adhesive composition, which may include (a) one or more epoxy resins, (b) a urethane resin having a weight average molecular weight (Mw) of 30,000 or less, and having a polytetrahydrofuran unit, (c) a core-shell rubber in the form of secondary particles in which two or more core-shell rubbers in the form of primary particles are aggregated and (d) one or more epoxy curing agents. The adhesive composition of the present application can provide excellent adhesion strength, peel strength and impact-resistant strength uniformly over a wide temperature range.

19 Claims, 1 Drawing Sheet

(56) References Cited

U.S. PATENT DOCUMENTS

| | | |
|---|---|---|
| 6,894,113 B2 | 5/2005 | Court et al. |
| 2003/0192643 A1 | 10/2003 | Schoenfeld et al. |
| 2004/0077784 A1 | 4/2004 | Ilenda et al. |
| 2005/0070634 A1 | 3/2005 | Lutz et al. |
| 2008/0188609 A1 | 8/2008 | Agarwal et al. |
| 2008/0200589 A1 | 8/2008 | Hubschmid |
| 2008/0251203 A1 | 10/2008 | Lutz et al. |
| 2008/0319105 A1 | 12/2008 | Lutz et al. |
| 2009/0264558 A1 | 10/2009 | Kramer et al. |
| 2009/0294057 A1 | 12/2009 | Liang et al. |
| 2010/0130655 A1 | 5/2010 | Agarwal et al. |
| 2011/0048637 A1 | 3/2011 | Kohli |
| 2011/0126981 A1 | 6/2011 | Lutz et al. |
| 2012/0071584 A1 | 3/2012 | Lutz et al. |
| 2012/0211161 A1 | 8/2012 | Lutz et al. |
| 2014/0275423 A1 | 9/2014 | Lutz et al. |
| 2015/0001281 A1 | 1/2015 | Jialanella et al. |
| 2015/0045510 A1 | 2/2015 | Braendli et al. |
| 2015/0291835 A1* | 10/2015 | Liu .................. C08G 59/1494 522/42 |
| 2016/0017192 A1 | 1/2016 | Lutz et al. |
| 2016/0122539 A1 | 5/2016 | Okamoto et al. |
| 2016/0251510 A1 | 9/2016 | Furukawa et al. |
| 2016/0272750 A1 | 9/2016 | Voci et al. |
| 2017/0321094 A1 | 11/2017 | Holtgrewe et al. |
| 2017/0349795 A1 | 12/2017 | Balijepalli et al. |
| 2018/0094176 A1 | 4/2018 | Okamoto et al. |
| 2020/0140722 A1 | 5/2020 | Hackett et al. |
| 2021/0238462 A1 | 8/2021 | Ko et al. |
| 2021/0269686 A1 | 9/2021 | Ko |
| 2021/0269689 A1 | 9/2021 | Ko et al. |
| 2021/0284882 A1 | 9/2021 | Ko et al. |
| 2021/0284883 A1 | 9/2021 | Ko |
| 2021/0284885 A1 | 9/2021 | Ko et al. |

FOREIGN PATENT DOCUMENTS

| | | |
|---|---|---|
| CN | 101528796 A | 9/2009 |
| CN | 101679579 A | 3/2010 |
| CN | 101821333 A | 9/2010 |
| CN | 102648262 A | 8/2012 |
| CN | 102911631 A | 2/2013 |
| CN | 105612215 A | 5/2016 |
| CN | 106543941 A | 3/2017 |
| CN | 107428913 A | 12/2017 |
| CN | 109593323 A | 4/2019 |
| EP | 2163579 A2 | 3/2010 |
| EP | 2137277 B1 | 5/2011 |
| EP | 3006478 A1 | 4/2016 |
| EP | 3056540 A1 | 8/2016 |
| EP | 3225673 A1 | 10/2017 |
| EP | 3281965 A1 | 2/2018 |
| JP | S64090233 A | 4/1989 |
| JP | H02117948 A | 5/1990 |
| JP | H05065391 A | 3/1993 |
| JP | H05214310 A | 8/1993 |
| JP | H08109362 A | 4/1996 |
| JP | 2004176045 A | 6/2004 |
| JP | 2009501258 A | 1/2009 |
| JP | 2009506169 A | 2/2009 |
| JP | 2009545656 A | 12/2009 |
| JP | 2010507706 A | 3/2010 |
| JP | 2010077305 A | 4/2010 |
| JP | 2010530472 A | 9/2010 |
| JP | 2011530648 A | 12/2011 |
| JP | 2012136590 A | 7/2012 |
| JP | 2013503249 A | 1/2013 |
| JP | 5647199 B2 | 12/2014 |
| JP | 2015514149 A | 5/2015 |
| JP | 2015108077 A | 6/2015 |
| JP | 2015537081 A | 12/2015 |
| JP | 2017132953 A | 8/2017 |
| JP | 2018506635 A | 3/2018 |
| JP | 2018090651 A | 6/2018 |
| JP | 6694425 B2 | 5/2020 |
| KR | 20080046194 A | 5/2008 |
| KR | 20100049545 A | 5/2010 |
| KR | 20100059818 A | 6/2010 |
| KR | 20100067560 A | 6/2010 |
| KR | 20120104516 A | 9/2012 |
| KR | 101467609 B1 | 12/2014 |
| KR | 20140138760 A | 12/2014 |
| KR | 101798680 B1 | 11/2017 |
| WO | 2007025007 A1 | 3/2007 |
| WO | 2008049857 A1 | 5/2008 |
| WO | 2014072515 A1 | 5/2014 |
| WO | 2014196607 A1 | 12/2014 |
| WO | 2015053289 A1 | 4/2015 |
| WO | 2016102329 A1 | 6/2016 |
| WO | 2016163491 A1 | 10/2016 |

OTHER PUBLICATIONS

Extended European Search Report including Written Opinion for EP19841015 issued Jun. 9, 2021; 7 pages.

ADEKA Corporation, "Epoxy resin—Product List ," Functional Chemicals, Feb. 25, 2022 search, 3 pages. <URL: https://adeka-chemical.meclib.jp/adeka_epoxy_JPN/book/#target/page_no=9.

Search Report dated Apr. 20, 2022 from Office Action for Chinese Application No. 201980048324.3 issued Apr. 25, 2022. 3 pgs.

International Search Report for Application No. PCT/KR2019/009232, mailed Oct. 24, 2019, pp. 1-2.

Extended European Search Report for Application No. EP 19841786.7, dated Aug. 4, 2021, 6 pages.

Search Report dated Apr. 30, 2022 from the Office Action for Chinese Application No. 201980049081.5 issued May 9, 2022, pp. 1-3.

Search report from International Application No. PCT/KR2019/009236, mailed Oct. 25, 2019.

Extended European Search Report for Application No. 19840736.3, dated Aug. 9, 2021, 7 pages.

Search Report dated May 19, 2022 from the Office Action for Chinese Application No. 201980049075.x issued May 25, 2022, pp. 1-3.

International Search Report for Application No. PCT/KR2019/009235, mailed Oct. 25, 2019, pp. 1-2.

Extended European Search Report Application No. EP 19840550.8, Dated Aug. 4, 2021, 7 pages.

Search Report dated May 19, 2022 from the Office Action for Chinese Application No. 201980049049.7 issued May 25, 2022, pp. 1-3.

Search report from International Application No. PCT/KR2019/009234, mailed Oct. 25, 2019.

Extended European Search Report and Written Opinion for EP Application No. 19840221.6 dated Aug. 10, 2021, 7 pgs.

Search Report dated May 8, 2022 from Office Action for Chinese Application No. 201980049181 issued May 12, 2022. 3 pgs.

* cited by examiner

[Figure 1]
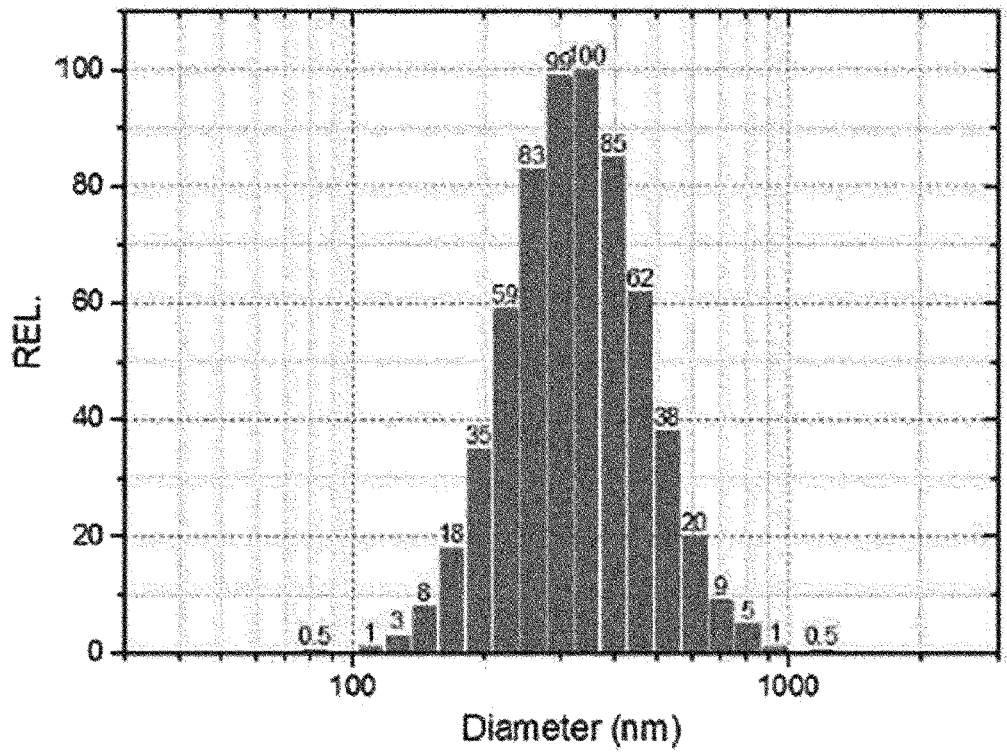
[Figure 2]
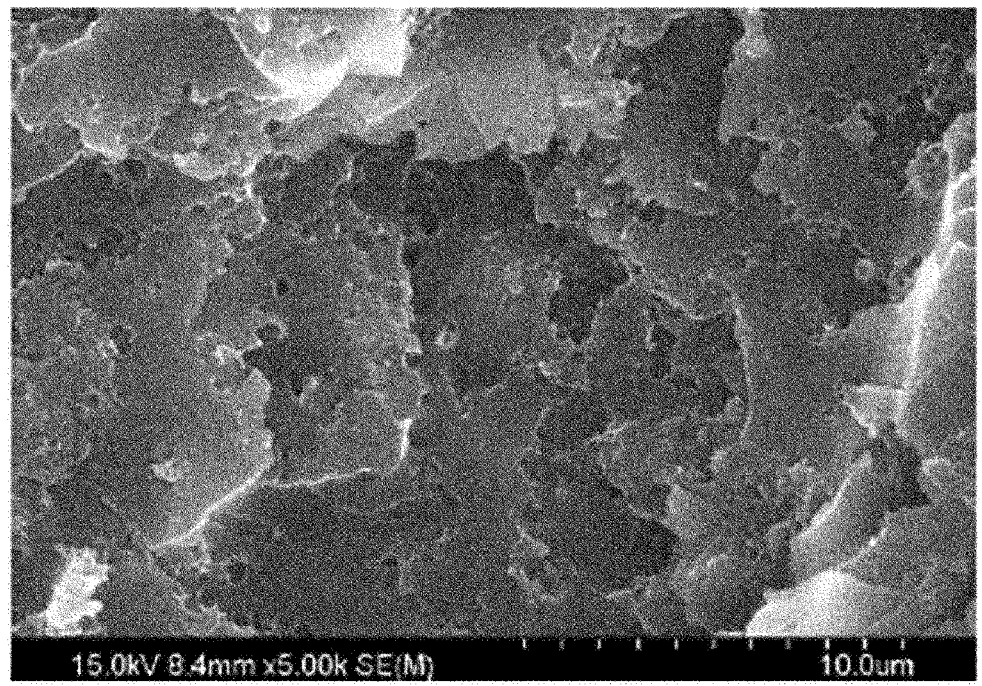

ADHESIVE COMPOSITION

CROSS-REFERENCE TO RELATED APPLICATIONS

The present application is a national phase entry under 35 U.S.C. § 371 of International Application No. PCT/KR2019/009229, filed on Jul. 25, 2019, which claims priority to Korean Patent Application No. 10-2018-0086342 filed on Jul. 25, 2018, the disclosures of which are incorporated herein by reference in their entirety.

TECHNICAL FIELD

The present application relates to an adhesive composition.

BACKGROUND ART

Adhesives comprising epoxy resins, that is, epoxy resin-based adhesives, have high heat resistance and excellent adhesion strength and thus are used to bond or join various kinds of base materials. For example, recently, the epoxy resin-based adhesives have been used for metal-metal joining or metal-plastic joining, and the like. In particular, when the epoxy resin-based adhesives are used in the automotive industry, there is an advantage that the cost can be reduced and the weight of the vehicle body can be reduced by reducing the number of welds required for manufacturing vehicle body frames. As a result, there is a growing expectation for application of epoxy resin adhesives in aerospace or wind power generation.

In consideration of accidents such as collisions, the epoxy resin-based adhesives used for automobiles require not only excellent adhesion strength but also impact-resistant strength. Then, these characteristics should be maintained uniformly over a wide range of temperatures in which automobiles are actually used, for example about −40 to 80° C. However, the epoxy resin-based adhesives according to the prior art have a problem that they do not provide sufficient strength for low temperature conditions such as −40° C.

DISCLOSURE

Technical Problem

It is one object of the present application to provide an epoxy resin-based adhesive composition.

It is another object of the present application to provide an adhesive composition exhibiting excellent adhesion strength, impact strength and shear strength, and the like over a wide temperature range.

The above objects and other objects of the present application can all be solved by the present application described in detail below.

Technical Solution

In one example of the present application, the present application relates to an adhesive composition comprising an epoxy-based resin. The adhesive composition may be used to bond homogeneous or heterogeneous base materials after curing. For example, the base material may comprise a metal component or a plastic component, whereby the adhesive composition may be used for metal-metal joining, metal-plastic joining or plastic-plastic joining, and the like. A joining body (hereinafter, may be referred to as a composite or a structure) of such a base material can be used, for example, as a component of an automobile or the like.

In the present application, the adhesive composition may comprise (a) one or more epoxy resins, (b) a urethane resin having a weight average molecular weight (Mw) of 30,000 or less, and having a polytetrahydrofuran unit, (c) a core-shell rubber in the form of secondary particles in which two or more core-shell rubbers in the form of primary particles are aggregated and (d) one or more epoxy curing agents. The adhesive composition of the present application comprising all of these configurations can provide excellent adhesion strength, impact-resistant strength and shear strength uniformly for a structure formed using the cured product of the adhesive composition from a low temperature such as −40° C. to a high temperature such as 80° C.

(a) Epoxy Resin

When all the (a) to (d) configurations are included, the specific structure of the epoxy resin used for the adhesive composition of the present application is not particularly limited. For example, the epoxy resin may be an epoxy resin having a saturated or unsaturated group, and may be an epoxy resin containing a cyclic structure or an acyclic structure. In addition, the specific kind of the epoxy resin used in the present application is not particularly limited either. For example, the epoxy resin may include a bisphenol-based epoxy resin such as bisphenol A series or bisphenol F series; a novolac-based epoxy resin; or an oxazolidone-containing epoxy resin, and the like.

In one example, the adhesive composition may comprise a bisphenol A-based epoxy resin and/or a bisphenol F-based epoxy resin. The type or structure of the specific bisphenol A-based or bisphenol-F epoxy resin is not particularly limited and known or commercially available epoxy resins can be used without limitation. For example, the trade name YD-128, YDF-170 or YD-011 from Kukdo Chemical, and the like can be used.

In one example, two or more resins having different epoxy equivalents from each other may be used as the epoxy resin. For example, two or more epoxy resins having different equivalents from each other within the epoxy equivalent range of 150 to 600 may be used.

In one example, a bisphenol A-based epoxy resin having a predetermined equivalent may be used. For example, the epoxy equivalent of the bisphenol A-based epoxy resin used in the adhesive composition may be 180 or more. Specifically, the epoxy equivalent of the bisphenol A-based epoxy resin may be 190 or more, 200 or more, or 210 or more. When the above equivalent is satisfied, it is suitable to implement the objects of the present application. Although not particularly limited, the epoxy equivalent upper limit of the bisphenol A-based epoxy resin may be 500 or less, or 400 or less. More specifically, the epoxy equivalent upper limit of the bisphenol A-based epoxy resin may be 300 or less, 290 or less, 280 or less, 270 or less, 260 or less, or 250 or less.

In one example, the adhesive composition may further comprise a bisphenol F-based epoxy resin. That is, in the present application, the adhesive composition may comprise a mixture (a) of epoxy resins in which two or more epoxy resins are mixed. When the bisphenol A-based epoxy resin and the bisphenol F-based epoxy resin are mixed and used, it may be advantageous to provide excellent and uniform strength characteristics regardless of the temperature range.

In one ash, the epoxy equivalent of the bisphenol F-based epoxy resin used in the adhesive composition may be less than 180. Specifically, the epoxy equivalent of the bisphenol F-based epoxy resin may be 175 or less, 170 or less, 165 or less, 160 or less, 155 or less, or 150 or less.

When the epoxy equivalent increases, the crosslinking density may generally decrease while the viscosity increases, and the strength observed after the composition has cured may be somewhat poor. In addition, when the epoxy equivalent decreases, there is a problem that cannot fully expect the effect of using the epoxy-based adhesive. However, when the resins having a predetermined epoxy equivalent as above are mixed and used, there is an advantage that can solve the above problems.

In one example, the epoxy resin having an epoxy equivalent satisfying the above range may be used in an amount of 30 parts by weight or more, 35 parts by weight or more, 40 parts by weight or more, or 45 parts by weight or more, relative to the content of the entire adhesive composition. The upper limit thereof is not particularly limited, but may be, for example, 80 parts by weight or less, or 75 parts by weight or less.

In another example, when two or more epoxy resins are used, the ratio (W1/W2) between the content of the bisphenol A-based resin (W1) and the content of the bisphenol F-based resin (W2) may be 0.50 or more, considering the desired effect. Specifically, the ratio (W1/W2) may be 0.55 or more, 0.60 or more, 0.65 or more, or 0.70 or more. Then, the upper limit of the ratio (W1/W2) may be adjusted in a range of, for example, 3.0 or less, 2.5 or less, 2.0 or less, or 1.5 or, specifically, 1.4 or 1.3 or less.

In the present application, the adhesive composition may comprise a mono epoxy resin. In the present application, the mono epoxy resin may mean a component having one epoxy functional group in the molecule. The mono epoxy resin is capable of lowering the viscosity of the adhesive and contributing to improvement of wettability, impact characteristics or adhesion (peeling) characteristics by adjusting the crosslinking density.

In one example, the mono epoxy resin may be used in an amount of 10 parts by weight or less relative to the total content of the adhesive composition. Specifically, the content of the mono epoxy resin may be, for example, 9 parts by weight or less, 8 parts by weight or less, 7 parts by weight or less, 6 parts by weight or less, or 5 parts by weight or less. The lower limit is not particularly limited, but may be, for example, 0.5 parts by weight or more.

(b) Urethane Resin

The urethane resin used in the present application is a modified urethane resin having a unit derived from polytetrahydrofuran, which may have a structure (capping structure) in which at least one of the isocyanate groups which are terminals of the urethane resin is terminated with a predetermined compound, as described below.

The urethane resin may contain an isocyanate unit, a polyol unit and a polytetrahydrofuran unit. In the present application, the fact that the urethane resin comprises predetermined units may mean a state where in a resin structure (main chain or side chain) formed by reaction of one or more compounds, the compounds are polymerized and simultaneously the units derived therefrom are included in the resin structure.

The specific kind of isocyanate used in the urethane resin is not particularly limited, and a known aromatic or non-aromatic isocyanate may be used. In a non-limiting example, the isocyanate can be nonaromatic. That is, upon forming the modified urethane resin, an isocyanate of aliphatic or alicyclic series may be used. In the case of using the non-aromatic isocyanate, impact resistance, or viscosity characteristics of the adhesive composition may be improved.

The kind of the usable non-aromatic isocyanate is not particularly limited. For example, an aliphatic polyisocyanate or its modified products can be used. Specifically, an aliphatic polyisocyanate such as hexamethylene diisocyanate, trimethylhexamethylene diisocyanate, lysine diisocyanate, norbornane diisocyanate methyl, ethylene diisocyanate, propylene diisocyanate or tetramethylene diisocyanate; an alicyclic polyisocyanate such as transcyclohexane-1,4-diisocyanate, isophorone diisocyanate, bis(isocyanatemethyl) cyclohexane diisocyanate or dicyclohexylmethane diisocyanate; or a carbodiimide-modified polyisocyanate or isocyanurate-modified polyisocyanate of at least one of the foregoing; and the like can be used. In addition, a mixture of two or more of the above-listed compounds can be used.

The kind of the polyol used at the time of forming the urethane resin is not particularly limited. For example, a tetrafunctional polyol such as pentaerythritol; a trifunctional polyol such as glycerin or trimethylolpropane; or a bifunctional polyol such as glycol may be used. In one example, a polyalkylene glycols such as polypropylene glycol may be used as the glycol.

In one example, a linear polyol may be used as the polyol. For example, a linear shape such as polypropylene glycol can be used. The linear polyol is a polyol having two hydroxyl groups in the molecule, which may usually mean one having hydroxyl groups at both ends of the molecule. Conversely, the polyol having three or more hydroxyl groups in the molecule can be said to be a branched polyol. Compared with the case of using a branched shape, the case of using a linear polyol makes it easy to control the molecular weight of the urethane resin in the range described below, which may be advantageous for improving the impact-resistant characteristics of the adhesive.

In one example, the polyol may be a polyol having an OH equivalent of 300 or more. For example, the OH equivalent lower limit of the polyol may be 400 or more, 500 or more, 600 or more, 700 or more, 800 or more, or 900 or more. The OH equivalent upper limit of the polyol is not particularly limited, but may be, for example, 2,000 or less, 1,900 or less, 1,800 or less, 1,700 or less, 1,600 or less, 1,500 or less, 1,400 or less, 1,300 or less, 1,200 or less, or 1,100 or less. When the equivalent range is satisfied, it is advantageous to improve impact-resistant characteristics, adhesion strength characteristics and peeling characteristics of the adhesive.

As described above, the urethane resin may have a structure in which one or more of its isocyanate ends are terminated by a predetermined compound. The so-called capping method of the isocyanate end in the urethane resin is not particularly limited. Known techniques can be used. For example, upon preparing the modified urethane resin, a method of introducing a compound capable of capping the isocyanate ends together thereto and polymerizing it may be used. The kind of the compound which is capable of capping isocyanate ends is not specifically limited, and for example, an amine-based compound, a phenol-based compound, an oxime-based compound, or a bisphenol-based compound can be used.

In one example, the urethane resin may comprise a unit in which the isocyanate end is terminated by polytetrahydrofuran. Since polytetra hydrofuran also has OH groups, the urethane resin may further comprise a unit in which the isocyanate end terminated by polytetrahydrofuran, when the urethane resin of the present application is synthesized by so-called one-pot synthesis.

In one example, the polytetrahydrofuran may have a weight average molecular weight (Mw) of 500 or more. In the present application, the "weight average molecular weight (Mw)" may be a polystyrene conversion molecular weight measured by GPC. For example, the weight average molecular weight of the polytetrahydrofuran may be 550 or more, 600 or more, 650 or more, 700 or more, 750 or more, 800 or more, or 850 or more. In one example, the weight average molecular weight upper limit of the polytetrahydrofuran may be 4,000 or less. Specifically, the weight average molecular weight of the polytetrahydrofuran may be 3,000 or less, or 2,000 or less, and may be, more specifically, 1,500 or less, 1,400 or less, 1,300 or less, or 1,200 or less.

In one example, the polytetrahydrofuran may have an OH equivalent of 400 to 2,200. When the OH equivalent is out of the above range, the impact-resistant characteristics of the adhesive may be lowered. Considering the impact-resistant characteristics, the polytetra hydrofuran may have, for example, an OH equivalent of 450 or more, or 500 or more, and may have an OH equivalent of 1,100 or less, or 1,000 or less.

In one example, the weight average molecular weight of the urethane resin having the above configuration may be in the range of 5,000 to 30,000. When the above range is satisfied, the physical properties suitable for the adhesive application of the present application can be provided.

In one example, the adhesive composition may comprise 5 parts by weight or more of the modified urethane resin based on the content of the entire adhesive composition. Specifically, the content of the modified urethane resin may be 6 parts by weight or more, 7 parts by weight or more, 8 parts by weight or more, 9 parts by weight or more, or 10 parts by weight or more. Although not particularly limited, the content upper limit of the urethane resin may be, for example, 25 parts by weight or less. More specifically, the urethane resin may be used in an amount of 20 parts by weight or less, 19 parts by weight or less, 18 parts by weight or less, 17 parts by weight or less, 16 parts by weight or less, or 15 parts by weight or less. When the urethane resin is used in an amount of less than the above range, the impact strength improvement is not sufficient, and when it is used in an amount of more than the above range, there is a problem that shear strength is lowered and high-temperature impact strength is lowered.

(c) Rubber

The adhesive composition comprises a core-shell rubber in the form of secondary particles in which two or more core-shell rubbers in the form of primary particles are aggregated.

In the present application, the "core-shell rubber" may mean a particulate (solid) material having a rubber component in a core portion and having a structure in which a shell material is grafted or crosslinked to the core.

Then, in the present application, the "core-shell rubber in the form of primary particles" may mean each unit body having the core-shell structure, and the "core-shell rubber in the form of secondary particles" may mean an aggregate (or conglomerate) formed by clumping two or more core-shell rubbers (particles) in the form of primary particles together. The core-shell rubbers may be dispersed and present in the adhesive composition.

In one example, the core-shell rubber particles in the primary form and the core-shell rubber particles in the secondary form can be prepared according to the methods described in the following examples. In this case, the aggregated rubbers in the secondary form produced by a polymerization reaction can be separated into smaller aggregated rubbers through a kneader such as a planetary mixer. In one example, all of the aggregated particles may not be separated in the form of complete primary particles, and some of the secondary particles may be separated into primary particles and present in a mixed form of primary and secondary particles. For example, the weight ratio of the primary particles may be 50 wt % or less, 40 wt % or less, 30 wt % or less, 20 wt % or less, 10 wt % or less, 5 wt % or less, 4 wt % or less, 3 wt % or less, 2 wt % or less, 1 wt % or less, or 0.5 wt % or less, relative to the total content of the core-shell rubbers. In one example, the weight ratio of the primary particles may be substantially 0 wt %. Alternatively, the weight ratio of the primary particles may be, for example, 0.01 wt % or more, 0.1 wt % or more, or 1 wt % or more.

In another example, the core-shell rubber particles in the primary form and the core-shell rubber particles in the secondary form may be prepared through a separate process.

The core may comprise a polymer of a diene-based monomer, or may comprise a copolymer of a diene-based monomer and a heterogeneous monomer component (not diene-based). Although not particularly limited, for example, butadiene or isoprene may be used as the diene-based monomer.

In one example, the core may be a butadiene-based core. For example, the core may comprise a polymer of butadiene. In addition, the core may comprise a copolymer of butadiene and another ethylenically unsaturated monomer. The ethylenically unsaturated monomer used upon core formation can be exemplified by a vinyl-based aromatic monomer, (methyl)acrylonitrile, an alkyl (meth)acrylate, and the like, but is not particularly limited thereto.

In one example, when the alkyl (meth)acrylate is additionally used in core formation, a different kind of alkyl (meth)acrylate from an alkyl (meth)acrylate used for shell formation, which is described below, can be used in the core.

The shell grafted or crosslinked to the core may comprise an alkyl (meth)acrylate unit. The fact that the shell comprises an alkyl (meth)acrylate unit means that an alkyl (meth)acrylate monomer can be used upon forming a shell polymer that is crosslinked or grafted to the core. In one example, as the alkyl (meth)acrylate, a lower alkyl (meth)acrylate having an alkyl group having 1 to 6 carbon atoms, such as methyl methacrylate, ethyl methacrylate or t-butyl methacrylate can be used, without being limited to the above-listed monomers.

The shell may further comprise a vinylidene-based monomer unit. For example, it may further comprise a unit of an aromatic vinyl monomer such as styrene, vinyl acetate or vinyl chloride. Although not particularly limited, in one example, the shell may comprise an alkyl (meth)acrylate unit and an aromatic vinyl monomer unit.

In one example, the core and shell may have a predetermined glass transition temperature (Tg). For example, the glass transition temperature (Tg) lower limit of the core may be $-60°$ C. or more, $-50°$ C. or more, or $-40°$ C. or more. Although not particularly limited, the glass transition temperature upper limit of the core may be $-20°$ C. or less, $-25°$ C. or less, $-30°$ C. or less, or $-35°$ C. or less. In addition, the shell may have, for example, a glass transition temperature (Tg) of $50°$ C. or more, $60°$ C. or more, or $70°$ C. or more. Although not particularly limited, the glass transition temperature upper limit of the shell may be $120°$ C. or less. The glass transition temperature can be measured according to a known method, and for example, can be measured using differential scanning calorimetry (DSC).

In one example, the core-shell rubber in the form of primary particles may have a ratio of the core particle diameter to the total core-shell particle diameter (=thickness ratio of the core in the core-shell, R) of 0.80 or more.

In the present application, the "particle diameter" may be used to mean a diameter of a particle-shaped (for example, spherical or ellipsoidal) core-shell rubber or the configuration thereof, and may mean the length of the longest dimension when the shape of the core-shell rubber is not completely spherical or ellipsoidal. The particle diameter-related features may be measured using known equipment, and for example, dynamic lighting scattering or laser diffraction equipment and the like may be used to identify the particle diameter-related features. Unless specifically defined, the particle diameter of the particles or particle size of the particles may be used in the sense of the average particle diameter to be described below.

For example, the ratio of the core particle diameter to the total core-shell particle diameter may be 0.81 or more, 0.82 or more, 0.83 or more, 0.84 or more, 0.85 or more, 0.86 or more, 0.87 or more, 0.88 or more, 0.89 or more, or 0.90 or more. The upper limit of the ratio may be, for example, 0.99, and specifically, may be 0.98 or less, 0.97 or less, 0.96 or less, 0.95 or less, 0.94 or less, 0.93 or less, or 0.92 or less. In the case of commercialized core-shell products, they do not satisfy the above range in many cases, so that the impact absorption function by the rubber is not sufficient, but the core-shell rubber satisfying the above range can sufficiently absorb the impact applied to the structure. In particular, when the ratio of the core exceeds 0.99, it becomes difficult for the shell to surround the core part while the thickness of the shell becomes thin, whereby a decrease in compatibility with the epoxy resin or a decrease in dispersibility may occur. In addition, when the ratio of the core is less than 0.8, the effect of improving the impact strength is insufficient.

For example, when the core-shell rubber in the form of primary particles has an average particle diameter of 250 nm or more, 260 nm or more, 270 nm or more, 280 nm or more, 290 nm or more, or 300 nm or more, and for example, the upper limit thereof is 600 nm or less or 500 nm or less, specifically, 450 nm or less, 440 nm or less, 430 nm or less, 420 nm or less, 410 nm or less, or 400 nm or less, the core-shell rubber in the form of primary particles may have a size that can satisfy the above ratio (R). At this time, the 'average particle diameter" means the diameter that the particle with 50% of the cumulative weight (mass) in the particle size distribution curve has (passes). For example, the core of the core-shell rubber in the form of primary particles may have an average particle diameter of 180 nm or more, 200 nm or more, 220 nm or more, 240 nm or more, 260 nm or more, 280 nm or more, 300 nm or more, and the upper limit thereof may be, for example, 500 nm or less, 495 nm or less, 490 nm or less, specifically, 450 nm or less, 400 nm or 350 nm or less. In the case of commercialized core-shell products, the size and ratio (R) of the corresponding particle diameter do not satisfy the above range in many cases, so that the impact absorption function by the rubber is not sufficient.

In another example, the core-shell rubber in the form of primary particles may have an average particle diameter of 250 nm or less. In this case, the lower limit thereof may be, for example, 10 nm or more, 20 nm or more, or 30 nm or more. Even in the case of having such a particle diameter, the core-shell rubber in the form of primary particles may have the ratio (R) of the core particle diameter to the total core-shell particle diameter satisfying the above range. In the case of commercialized core-shell products, the size of the corresponding particle diameter does not satisfy the above range in many cases, so that the impact absorption function by the rubber is not sufficient.

Also, in the present application, the core-shell rubber may have a predetermined particle size distribution.

In one example, the core-shell rubber in the form of primary particles may have a diameter of $D_{10}$ in the particle diameter distribution, that is, a diameter up to cumulative 10% particles on the basis of weight (mass), from the smaller side of the particle diameters by the particle size distribution measurement, in a range of 180 to 220 nm.

In another example, the core-shell rubber in the form of primary particles may have a diameter of $D_{50}$ in the particle diameter distribution, that is, a diameter up to cumulative 50% particles on the basis of weight (mass), from the smaller side of the particle diameters by the particle size distribution measurement, in a range of 250 to 350 nm.

In another example, the core-shell rubber in the form of primary particles may have a diameter of $D_{90}$ in the particle diameter distribution, that is, a diameter up to cumulative 90% particles on the basis of weight (mass), from the smaller side of the particle diameters by the particle size distribution measurement, in a range of 450 to 510 nm.

In one example, the core-shell rubber in the form of primary particles may have a particle size distribution width of 2.0 or less or 1.5 or less obtained by the following equation 1. The lower limit thereof is not particularly limited, which may be, for example, 0.5 or more, 0.6 or more, 0.7 or more, 0.8 or more, 0.9 or more, or 1.0 or more.

$$(D_{90}-D_{10})/(D_{50}) \qquad \text{[Equation 1]}$$

As described above, when the core-shell rubber having a narrow particle size distribution width is used, it is advantageous to uniformly secure excellent adhesion strength, peel strength, and impact-resistant strength in a wide temperature range.

Such particle diameter characteristics can be obtained through, for example, a method of appropriately adjusting the type or content of monomers used upon core or shell formation, or a method of dividing the monomers into several stages to be introduced or appropriately adjusting the polymerization time of the core or shell or other polymerization conditions, and the like.

In one example, the number of primary particles aggregated for secondary particle formation is not particularly limited. For example, the primary particles may be aggregated to form secondary particles, so that the core-shell rubber conglomerate (aggregate), that is, the secondary particles may have a diameter in a range of 0.1 to 10 μm. In one example, the core-shell rubber (aggregated particles) in the form of secondary particles, which has undergone a kneading process through a kneader such as a planetary mixer after polymerization, may have a size of 2 μm or less, 1.5 μm or less, 1 μm or less, or 0.5 μm or less. In relation to the secondary particles, the size may be used in the sense corresponding to the particle diameter or the size of the longest dimension as described above.

In one example, the average particle diameter of the core-shell rubber in the form of secondary particles may be 1.5 μm or less, or 1 μm or less. Specifically, the average particle diameter of the core-shell rubber may be 900 nm or less, 800 nm or less, 700 nm or less, or 600 nm or less. Although not particularly limited, the average particle diameter lower limit of the core-shell rubber in the form of secondary particles may be 100 nm or more, 200 nm or more, 300 nm or more, 400 nm or more, or 500 nm or more.

The core-shell rubber in the form of secondary particles satisfying the above-described characteristics may be included in an amount of 5 parts by weight or more based on the total content of the adhesive composition. Specifically, the lower limit of the content may be 6 parts by weight or more, 7 parts by weight or more, 8 parts by weight or more, 9 parts by weight or more, or 10 parts by weight or more. In addition, the content of the core-shell rubber conglomerate may be 35 parts by weight or less. Specifically, the upper limit of the content may be 34 parts by weight or less, 33 parts by weight or less, 32 parts by weight or less, 31 parts by weight or less, or 30 parts by weight or less, and more specifically, may be 25 parts by weight or less, or 20 parts by weight or less. When it is used less than the content, the impact strength improvement effect is not sufficient, and when it is used in excess of the above range, it is not preferable because shear strength and high-temperature impact strength may be lowered.

In one example, the adhesive composition may further comprise a liquid rubber.

In one example, the liquid rubber may be a configuration having an epoxy group at the end of the liquid rubber, which is a homopolymer of a diene-based monomer or a copolymer of a diene-based monomer and a heterogeneous monomer. That is, the liquid rubber may be an epoxy terminated liquid rubber.

For example, the liquid rubber may comprise a homopolymer or copolymer having repeating units derived from butadiene or isobutadiene. In the liquid rubber, for example, a copolymer of butadiene or isobutadiene and an acrylate and/or an acrylonitrile may be included.

In one example, the content of the liquid rubber may be the same as that of the above-described core-shell rubber.

In one example, the adhesive composition may comprise at least 5 parts by weight or 10 parts by weight or more of a rubber (core-shell rubber and/or liquid rubber) based on the total content of the adhesive composition. For example, when the adhesive composition comprises only the core-shell rubber, the adhesive composition may comprise at least 5 parts by weight or 10 parts by weight or more of the core-shell rubber based on the total content of the adhesive composition. Alternatively, when the adhesive composition comprises both the core-shell rubber and the liquid rubber, the adhesive composition may comprise at least 5 parts by weight or 10 parts by weight or more of the core-shell rubber and the liquid rubber based on the total content of the adhesive composition. Even in such a case, the rubber components may be used in an amount of 35 parts by weight or less, in consideration of shear strength and high-temperature impact strength. In one example, the adhesive composition may comprise a rubber (core-shell rubber and/or liquid rubber) in an amount of 10 parts by weight or more, 12 parts by weight or more, or 14 parts by weight or more, and 30 parts by weight or less, 25 parts by weight or less, or 22 parts by weight or less, based on the total content of the adhesive composition.

(d) Epoxy Curing Agent

The adhesive composition may comprise a predetermined curing agent so that it can be cured at a temperature of about 80° C. or more, or about 100° C. or more. If the curing can occur in the above temperature range, the type of the curing agent is not particularly limited. For example, as the curing agent, a dicyandiamide, a melamine, a diallyl melamine, a guanamine (e.g. acetoguanamine, benzoguanamine), an aminotriazole (3-amino-1,2,4-triazole), a hydrazide (adipic acid dihydride, stearic acid dihydrazide, isophthalic acid dihydrazide), a cyanoacetamide or an aromatic polyamine (e.g.: diaminodiphenylsulfone), and the like can be used.

Although not particularly limited, the curing agent may be used in an amount of, for example, 1 part by weight or more, 2 parts by weight or more, 3 parts by weight or more, or 4 parts by weight or more, based on the total content of the adhesive composition. Although not particularly limited, the content upper limit of the curing agent may be 15 parts by weight or less, 14 parts by weight or less, 13 parts by weight or less, 12 parts by weight or less, 11 parts by weight or less, or 10 parts by weight or less.

(e) Other Components

The adhesive composition may comprise a catalyst to control the rate and temperature of the curing reaction by the curing agent. The type of the catalyst is not particularly limited, and various kinds of known catalysts may be appropriately used.

In one non-limiting example, as the catalyst, urea series such as p-chlorophenyl-N,N-dimethylurea, 3-phenyl-1,1-dimethylurea or 3,4-dichlorophenyl-N,N-dimethylurea; tertiary acrylics; amines such as benzyldimethylamine; piperidine or derivatives thereof, or imidazole derivatives may be used.

Although not particularly limited, the catalyst may be used, for example, in an amount of 0.1 parts by weight or more, 0.2 parts by weight or more, 0.3 parts by weight or more, or 0.4 parts by weight or more, based on the total content of the adhesive composition. Although not particularly limited, the upper limit of the catalyst content may be 2 parts by weight or less.

In one example, the adhesive composition may further comprise a particulate inorganic filler, that is, inorganic particles. When the inorganic filler is used, it is possible to adjust the mechanical properties, rheological properties and the like of the adhesive. The form of the inorganic filler may be rectangular, spherical, platy or acicular, which is not particularly limited.

As the inorganic filler, for example, calcium oxide, quartz powder, alumina, calcium carbonate, calcium oxide, aluminum hydroxide, magnesium calcium carbonate, barite, hydrophilic or hydrophobic silica particles, or aluminum magnesium calcium silicate can be used. When silica particles are used, it is more preferable that they have hydrophobicity.

Although not particularly limited, the inorganic filler may be used in an amount of, for example, 1 part by weight or more, 2 parts by weight or more, 3 parts by weight or more, or 4 parts by weight or more, based on the total content of the adhesive composition. Although not particularly limited, the upper limit of the inorganic filler content may be 15 parts by weight or less, or 10 parts by weight or less.

In one example, the composition may further comprise various kinds of additives. For example, known plasticizers, reactive or non-reactive diluents, coupling agents, fluidity modifiers, thixotropic agents, colorants, and the like may further be included in the adhesive composition. The specific kind of the additive is not particularly limited, and known materials or commercial products may be used without limitation.

Although not particularly limited, the additive may be used in an amount of, for example, 0.1 parts by weight or more, 1 part by weight or more, 2 parts by weight or more, or 3 parts by weight or more, based on the total content of the adhesive composition. Although not particularly limited, the upper limit of the additive content may be 15 parts by weight or less, 14 parts by weight or less, 13 parts by weight or less, 12 parts by weight or less, 11 parts by weight or less, or 10 parts by weight or less.

In another example of the present application, the present application relates to a structure comprising a cured product of the adhesive composition. The structure may comprise a base material and a cured product of the adhesive composition cured after being applied on the base material. The base material may comprise a metal component, a plastic component, wood, a glass fiber-containing base material, and the like.

In one example, the structure may have a form in which two or more base materials are bonded via the cured product. For example, the structure may have a form in which a metal and a metal are bonded via the cured product, a form in which a metal and a plastic are bonded via the cured product, or a form in which a plastic and a plastic are bonded via the cured product. The structure can be used as a structural material for aerospace, wind power generation, ships or automobiles.

In another example of the present application, the present application relates to a method for producing a structure. The method may comprise steps of applying a composition having a configuration as described above on a surface of a base material and curing the composition applied to the surface of the base material. The application may be performed such that physical contact between the base material and the adhesive composition occurs.

The method of applying the adhesive composition to the surface of the structure is not particularly limited. For example, jet spraying methods such as swirl or streaming, or mechanical application by an extrusion method can be used. The application may be made to one or more base materials to be bonded.

The curing temperature is not particularly limited. For example, the curing may be performed at 80° C. or more, or 100° C. or more. Although not particularly limited, considering heat-resistant stability, it is preferable to perform the curing at a temperature of 220° C. or less.

Advantageous Effects

According to one example of the present application, an adhesive composition providing excellent adhesion strength, peel strength and impact-resistant strength uniformly over a wide temperature range can be provided.

BRIEF DESCRIPTION OF DRAWINGS

FIG. 1 shows the particle size distribution of the core-shell rubbers (in the form of primary particles) prepared according to one embodiment of the present application. The horizontal axis means particle diameters, and the vertical axis means relative numbers of rubbers.

FIG. 2 is an image taken to the appearance that the core-shell rubbers prepared according to one embodiment of the present application are dispersed in an epoxy resin.

MODE FOR INVENTION

Hereinafter, the present application will be described through examples and comparative examples. However, the scope of the present application is not limited by the scope set forth below.

PRODUCTION EXAMPLES

Production Example 1: Production of Core-Shell Rubber Assembly

First step (production of core): 70 parts by weight of ion-exchanged water, 60 parts by weight of 1,3-butadiene as a monomer, 1.0 part by weight of sodium dodecylbenzene sulfonate as an emulsifier, 0.85 parts by weight of calcium carbonate, 0.28 parts by weight of tertiary dodecyl mercaptan and 0.28 parts by weight of persulfate potassium as an initiator were introduced into a nitrogen-substituted polymerization reactor, and reacted at 75° C. until a polymerization conversion ratio was 30 to 40%. Thereafter, 0.3 parts by weight of sodium dodecylbenzene sulfonate was introduced thereto, 20 parts by weight of 1.3-butadiene was further introduced thereto, and the temperature was raised to 80° C. to terminate the reaction at the time when the polymerization conversion ratio was 95%. The produced polymer had a latex gel content of 73%. At this time, the rubber latex was coagulated with a dilute acid or a metal salt, and then washed, dried in a vacuum oven at 60° C. for 24 hours, and 1 g of the resulting rubber was placed in 100 g of toluene and stored in a dark room at room temperature for 48 hours, and then the latex gel content was measured by separating the sol and the gel.

Second step: 70 parts by weight of the produced rubber latex was put into a closed reactor, and the temperature of the reactor filled with nitrogen was raised to 75° C. Thereafter, 0.1 parts by weight of sodium pyrophosphate, 0.2 parts by weight of dextrose and 0.002 parts by weight of ferrous sulfide were introduced into the reactor in a lump.

In a separate mixing device, 25.5 parts by weight of methyl methacrylate, 4.5 parts by weight of styrene, 0.5 parts by weight of sodium dodecylbenzene sulfonate as an emulsifier, 0.1 parts by weight of cumene hydroperoxide and 20 parts by weight of ion-exchanged water were mixed to prepare a monomer emulsion.

To the reactor to which the rubber latex had been introduced, the emulsion was continuously added over 3 hours, and then, after 30 minutes, 0.03 parts by weight of hydroperoxide was added and aged at the same temperature for 1 hour to terminate the reaction at the time when the polymerization conversion ratio was 98%.

At an appropriate time in the process, the average particle diameter of the core measured by Nicomp N300 dynamic light scattering equipment was 320 nm, and the average particle diameter of the core-shell rubber resin latex was 345 nm.

In addition, the particle size distribution of the produced core-shell rubber in the form of primary particles was measured, and the results were described in FIG. 1.

Thereafter, an antioxidant was added to the reactant, aggregated with magnesium sulfate, and then dehydrated and dried to produce a core-shell rubber in an aggregated form.

Production Example 2: Production of Modified Urethane Resin 109.76 g of polytetrahydrofuran having an OH equivalent of 500, 36.92 g of hexamethylene diisocyanate, 2.51 g of propylene glycol, 22.75 g of t-butylphenol and 0.1 g of a tin catalyst were introduced into a nitrogen-substituted polymerization reactor and mixed, and reacted at 75° C. to produce a urethane resin.

Production Example 3: Production of Modified Urethane Resin 493.92 g of polytetrahydrofuran having an OH equivalent of 2,250, 36.92 g of hexamethylene diisocyanate, 2.51 g of propylene glycol, 22.75 g of t-butylphenol and 0.1 g of a tin catalyst were introduced into a nitrogen-substituted polymerization reactor and mixed, and reacted at 75° C. to produce a urethane resin.

Production Example 4: Production of Structural Adhesive

The compositions of Examples and Comparative Examples containing the components shown in Table 1 below in predetermined contents (weight ratio: parts by weight) were prepared as adhesive materials. Specifically, the core-shell rubber conglomerates and the epoxy resins were placed in a planetary mixer and mixed at 80° C. for 5 hours. The appearance that the core-shell rubbers are dispersed in the epoxy resin is as shown in FIG. 2. Thereafter, the remaining components excluding 'the urethane resin, the curing agent and the catalyst' were placed in the planetary mixer and stirred at 80° C. for 3 hours. Finally, the temperature was lowered to 40° C., 'the urethane resin, the curing agent and the catalyst' were put in the planetary mixer and mixed for 1 hour, and then the temperature was lowered to room temperature (about 23° C.) to terminate the kneading.

Method of Measuring Physical Properties

Impact Peel Strength

Five specimens were manufactured for each of Examples and Comparative Examples, and an object weighing 45 kg was dropped freely at a rate of 2 m/s at a height of 1.5 m in accordance with DIN ISO 11343, and the impact peel strength (unit: N/mm) was measured at each of 80° C., 23° C. and −40° C. and the average value was taken.

In the case of the specimen, two cold rolled steel having a size of 90 mm×25 mm×1.6 mm (length×width×thickness) and a strength of 440 MPa were prepared, and the adhesive was applied to a predetermined area of the cold rolled steel so that the adhesive area of the cold rolled steel was 25 mm×30 mm, and cured at 180° C. for 20 minutes. Using glass beads, the thickness of the adhesive layer was kept uniform at 0.2 mm. The measurement results were described in Table 2.

Shear Strength Experiment

For the specimens prepared in connection with Examples and Comparative Examples, five shear strength measurements were performed in accordance with DIN EN 1465 and the average value was taken. At this time, the shear strength (unit: Mpa) measurement was made under conditions of 10 mm/min and 23° C.

In the case of the specimen, two cold rolled steel sheets having a size of 100 mm×25 mm×1.6 mm (length×width×thickness) and a strength of 440 MPa were prepared, and the adhesive was applied to a predetermined area of the cold rolled steel so that the adhesive area of the cold rolled steel was 25 mm×10 mm, and cured at 180° C. for 20 minutes. Using glass beads, the thickness of the adhesive layer was kept uniform at 0.2 mm. The measurement results were described in Table 2.

EXPERIMENT RESULTS

TABLE 1

|  | Example | | Comparative Example | | | |
| --- | --- | --- | --- | --- | --- | --- |
|  | 1 | 2 | 1 | 2 | 3 | 4 |
| First epoxy resin[1] | 30 | 20 | 30 | 30 | 30 | 10 |
| Second epoxy resin[2] | 25 | 28 | 25 | 25 | 25 | 30 |
| Core-shell rubber[3] | 15 | 12 | — | 15 | 15 | — |
| Core-shell rubber[4] | — | — | 15 | — | — | — |
| Liquid rubber[5] | — | 10 | — | — | — | 30 |
| Modified urethane resin[6] | 10 | 10 | 10 | — | — | 10 |
| Modified urethane resin[7] | — | — | — | 10 | — | — |
| Modified urethane resin[8] | — | — | — | — | 10 | — |
| Mono epoxy resin[9] | 1.6 | 1.6 | 1.6 | 1.6 | 1.6 | 1.6 |
| Colorant[10] | 0.05 | 0.05 | 0.05 | 0.05 | 0.05 | 0.05 |
| Curing agent[11] | 6 | 6 | 6 | 6 | 6 | 6 |
| Catalyst[12] | 1 | 1 | 1 | 1 | 1 | 1 |
| CaCO$_3$ | 7 | 7 | 7 | 7 | 7 | 7 |
| CaO | 1 | 1 | 1 | 1 | 1 | 1 |
| Fumed silica[13] | 3 | 3 | 3 | 3 | 3 | 3 |
| Silane coupling agent[14] | 0.35 | 0.35 | 0.35 | 0.35 | 0.35 | 0.35 |

1. First epoxy resin[1]: Bisphenol A-based epoxy resin having an epoxy equivalent of about 180 or more
2. Second epoxy resin[2]: Bisphenol F-based epoxy resin having an epoxy equivalent of less than about 180
3. Core-shell rubber[3]: Core-shell rubber of Production Example 1
4. Core-shell Rubber[4]: Paralloid EXL2600 from DOW
5. Liquid rubber[5]: Struktol Polydis6401
6. Modified urethane resin[6]: Urethane resin of Production Example 2
7. Modified urethane resin[7]: Huntzman DY965
8. Modified urethane resin[8]: Urethane resin of Production Example 3
9. Mono epoxy resin[9]: NC513 from Cardolite
10. Colorant[10]: Pigment violet 23
11: Curing agent[11]: Airproduct 1200G
12: Catalyst[12]: Evonik Amicure UR7/10
13: Fumed silica[13]: Cabo TS720
14: Silane coupling agent[14]: GE Advanced material A-187

TABLE 2

|  | Example | | Comparative Example | | | |
| --- | --- | --- | --- | --- | --- | --- |
|  | 1 | 2 | 1 | 2 | 3 | 4 |
| Impact strength (−40° C.) | 40 | 36 | 28 | X | 10 | 6 |
| Impact strength (23° C.) | 45 | 42 | 30 | 44 | 32 | 32 |
| Impact strength (80° C.) | 40 | 39 | 28 | 38 | 30 | 28 |
| Shear strength (23° C.) | 35 | 34 | 24 | 34 | 29 | 28 |

X: the case where the stably measured value is not obtained because the measured value is very low

The invention claimed is:

1. An adhesive composition comprising:
   (a) an epoxy resin;
   (b) a urethane resin having a weight average molecular weight (Mw) of 30,000 or less, and having a polytetrahydrofuran unit;
   (c) a core-shell rubber in the form of primary particles, and secondary particles in which two or more core-shell rubbers in the form of the primary particles are aggregated; and
   (d) one or more epoxy curing agents,
   wherein a weight ratio of the core-shell rubber in the form of the primary particles relative to a total content of the core-shell rubber is 50 wt % to 0 wt %, and the core-shell rubber in the form of the secondary particles constitutes a remainder of the total content of the core-shell rubber, and
   wherein the urethane resin (b) comprises a unit in which an isocyanate group which is a terminal of the urethane resin is terminated by the polytetrahydrofuran unit.

2. The adhesive composition according to claim 1, wherein the epoxy resin comprises a bisphenol A-based epoxy resin.

3. The adhesive composition according to claim 2, wherein the bisphenol A-based epoxy resin has an epoxy equivalent in a range of 180 to 500.

4. The adhesive composition according to claim 2, wherein the epoxy resin further comprises a bisphenol F-based epoxy resin.

5. The adhesive composition according to claim 4, wherein the bisphenol F-based epoxy resin has an epoxy equivalent of less than 180.

6. The adhesive composition according to claim 1, wherein the polytetrahydrofuran unit has an OH equivalent in a range of 400 to 2,200.

7. The adhesive composition according to claim 6, wherein the polytetrahydrofuran unit has an OH equivalent of 1,100 or less.

8. The adhesive composition according to claim 1, wherein the urethane resin (b) comprises a non-aromatic isocyanate unit, a polyol unit and the polytetrahydrofuran unit.

9. The adhesive composition according to claim 8, wherein the urethane resin (b) further comprises a unit in which at least one isocyanate end is end-terminated by an amine-based compound, a phenol-based compound, an oxime-based compound, or a bisphenol-based compound.

10. The adhesive composition according to claim 1, wherein the urethane resin (b) is present in an amount of 5 to 25 parts by weight based on a total content of the adhesive composition.

11. The adhesive composition according to claim 1, wherein the core-shell rubber in the form of primary particles has an average particle diameter of 250 nm to 500 nm.

12. The adhesive composition according to claim 11, wherein cores in the core-shell rubber in the form of primary particles has an average particle diameter of 180 to 495 nm.

13. The adhesive composition according to claim 11, wherein cores in the core-shell rubber in the form of primary particles has an average particle diameter of 280 to 490 nm.

14. The adhesive composition according to claim 11, wherein the core-shell rubber in the form of primary particles has a ratio of a core particle diameter to a total particle diameter of the core-shell satisfying 0.8 to 0.99.

15. The adhesive composition according to claim 1, wherein the core-shell rubber has a butadiene-based cores.

16. The adhesive composition according to claim 1, wherein the core-shell rubber (c) is present in an amount of 5 to 35 parts by weight based on a total content of the adhesive composition.

17. The adhesive composition according to claim 15, further comprising a liquid rubber, wherein a total rubber content is 10 parts by weight or more based on a total content of the adhesive composition.

18. A structure comprising a cured product of the adhesive composition according to claim 1; and a base material in contact with the cured product.

19. A method for producing a structure, comprising: applying the composition according to claim 1 to a surface of a base material; and curing the composition applied to the surface of the base material.

* * * * *